United States Patent [19]
Gibson

[11] 4,043,213
[45] Aug. 23, 1977

[54] DRIVE ASSEMBLIES FOR MINING APPARATUS

[75] Inventor: John Gibson, Newton Aycliffe, England

[73] Assignee: Gewerkschaft Eisenhutte Westfalia, Lunen, Germany

[21] Appl. No.: 742,323

[22] Filed: Nov. 16, 1976

[30] Foreign Application Priority Data

Nov. 17, 1975 United Kingdom ............... 47257/75

[51] Int. Cl.² .......................... F16H 7/08; F16H 7/10
[52] U.S. Cl. ................................................ 74/242.8
[58] Field of Search ...................... 74/242.8, 242.13 A

[56] References Cited
U.S. PATENT DOCUMENTS

| | | | |
|---|---|---|---|
| 2,798,380 | 7/1957 | Morton | 74/242.8 |
| 3,332,293 | 7/1967 | Austin et al. | 74/242.8 X |
| 3,857,473 | 12/1974 | Kornylak | 74/242.8 X |

Primary Examiner—Leonard H. Gerin
Attorney, Agent, or Firm—Sughrue, Rothwell, Mion, Zinn and Macpeak

[57] ABSTRACT

A drive assembly for use with mining apparatus such as conveyors or coal ploughs includes a chain tensioning device which is incorporated in the housing of a resilient coupling device which forms part of the transmission from a drive motor to the mining apparatus.

15 Claims, 6 Drawing Figures

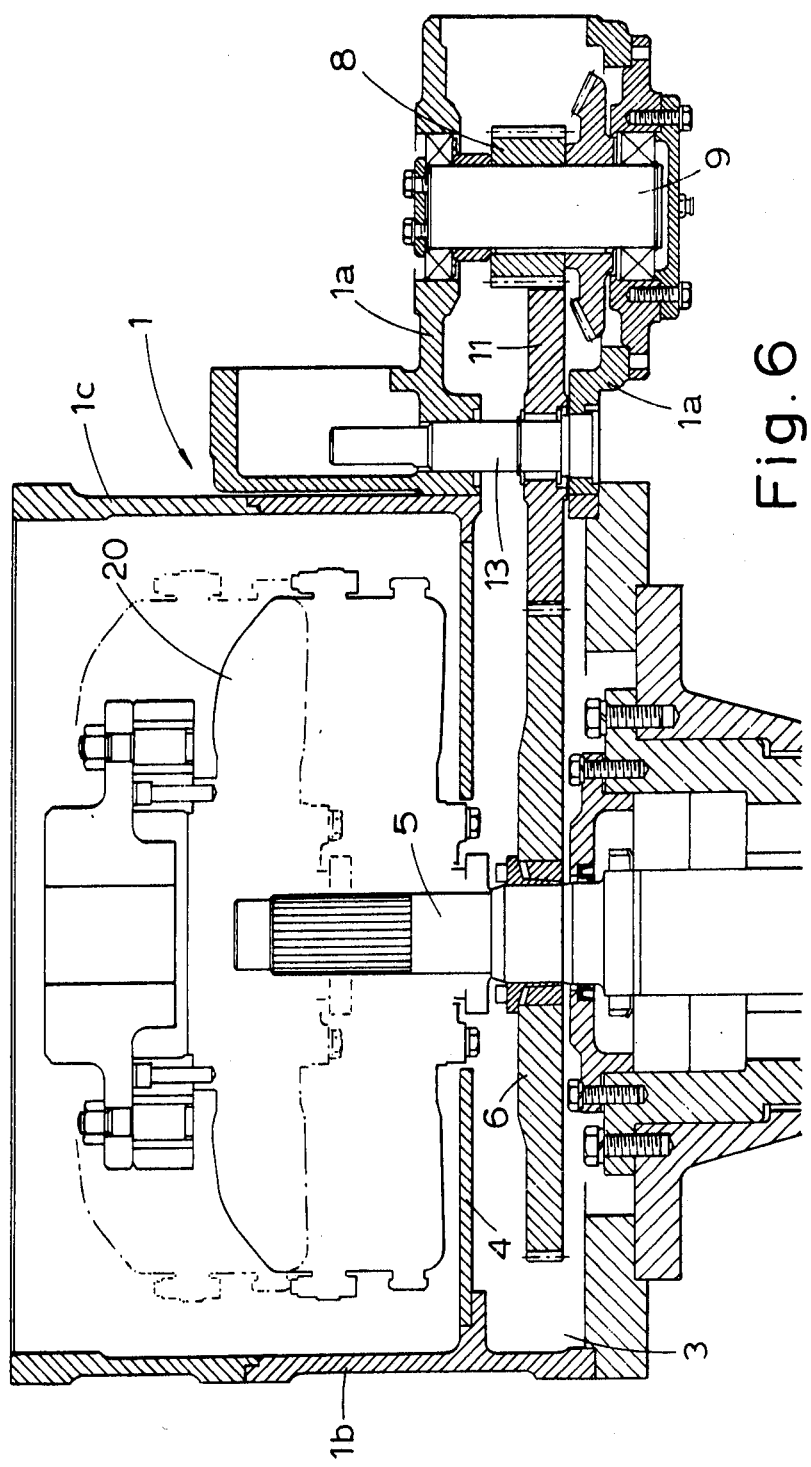

DRIVE ASSEMBLIES FOR MINING APPARATUS

BACKGROUND OF THE INVENTION

A drive assembly or station for mining apparatus such as a conveyor or a coal plough is required to drive one or more chains by way of a rotary drum. It is often desired for the drive assembly to drive the drum at a low speed very much below the normal operating speed so as to slacken or tension the previously locked chain or chains during installation or repair work for example. To this end, a drive assembly is known which employs an additional drive motor especially for driving the drum at this low speed.

A standard form of drive assembly has main gearing in a housing which is connected to the machine frame of a conveyor, and is driven from an electric motor through a fluid coupling. In the case of the drive assembly for a plough, a safety device in the form of a shear pin drum is often provided on the side of the gearbox remote from the conveyor and has shear pins which shear if the chain load becomes excessive.

When auxiliary gearing is required to drive the chain drum at a low speed, the construction described above must be extensively modified and two different types of drive assembly manufactured, one with and one without auxiliary gearing. In consequence both the manufacturer and the user have to incur the expense of holding extra stocks. Also, where the user needs to change from an assembly without auxiliary gearing to one with such gearing, or vice-versa, difficulties are encountered since these tasks have to be performed in dirty and badly lit conditions in restricted spaces underground.

U.S. Pat. Nos. 3,855,871 and 3,863,522 describe mining apparatus including a drum for driving a chain, a main motor for driving the drum at an operating speed by way of a transmission comprising a gearbox and a chain-tensioning device having an auxiliary motor for driving the drum at a reduced speed. The chain-tensioning device is secured to the gearbox and is in the form of a self-contained unit.

SUMMARY OF THE INVENTION

Broadly stated, the present invention provides a drive assembly of the general type described in U.S. Pat. Nos. 3,855,871 and 3,863,522, but has the chain-tensioning device incorporated in the housing of a resilient coupling device which transfers drive from the main motor to the gearbox.

Accordingly, the invention provides a drive assembly for a mineral mining installation, said assembly comprising:
 a. a rotatable output member;
 b. a transmission;
 c. a main motor for driving said rotatable output member via said transmission; and
 d. a chain-tensioning device for driving said rotatable output member at a reduced speed:
said transmission comprising:
 1. main gearing in driving connection with said rotatable output member;
 2. a gear input shaft for said main gearing; and
 3. a resilient coupling device in driving connection with said main gearing via said gear input shaft and in driven connection with said main motor;
wherein said chain-tensioning device and said resilient coupling device are mounted in the same housing.

The resilient coupling device may be a fluid coupling or a rubber-type coupling.

Said housing may be of one-piece construction or may be formed of two or three sections. Where said housing is formed in two sections, one section houses said chain-tensioning device and the other section houses said resilient coupling device. The three-section housing is used where said transmission includes a heavy fluid coupling and, in this case, one section houses said chain-tensioning device and the other two sections house said fluid coupling device. The advantage of this arrangement is that one of the sections housing said fluid coupling device can be positioned after the fluid coupling device has been lowered into place.

Said housing may also incorporate a dividing plate positioned between said chain-tensioning device and said resilient coupling device. This dividing plate minimizes the access of dust into the chain-tensioning device.

DESCRIPTION OF THE DRAWINGS

FIG. 6 is a view similar to that of FIG. 3 and shows a modified form of fluid coupling/chain-tensioning device.

DESCRIPTION OF PREFERRED EMBODIMENT

Figure 1:
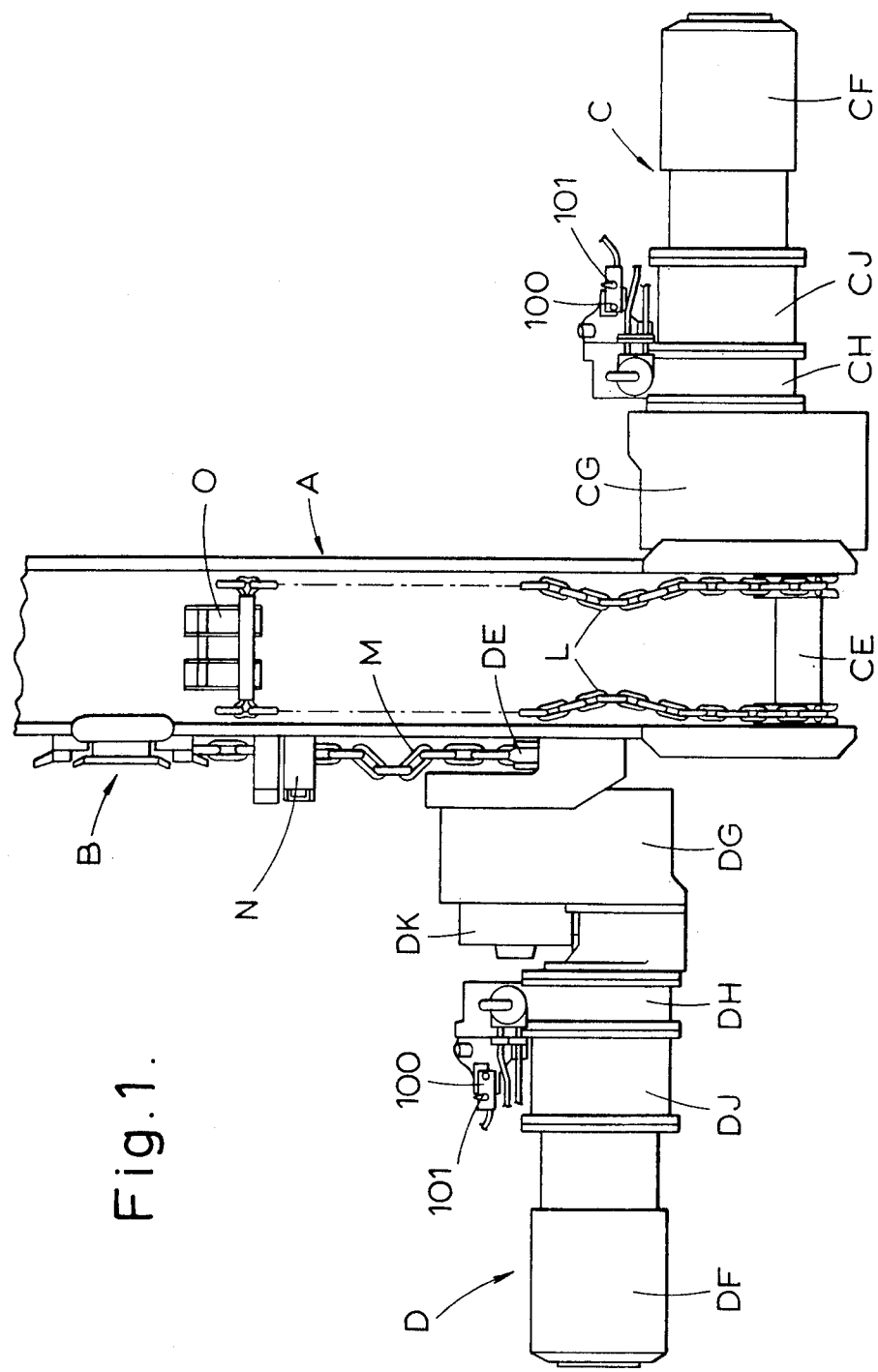
FIG. 1 is a diagrammatic view of the mineral mining apparatus described in U.S. Pat. Nos. 3,855,871 and 3,863,522 and shows part of a face conveyor and drive assemblies for the conveyor and for a plough, each drive assembly incorporating a chain-tensioning device in the form of a self-contained unit.

Referring to the drawings, FIG. 1 shows in a diagrammatic form the components of the mineral mining apparatus described in U.S. Pat. Nos. 3,855,871 and 3,863,522. These components are: a face conveyor A, a plough B, and drive assemblies C and D for the conveyor and plough respectively.

The drive assembly for the conveyor A comprises a drum CE which is driven from an electric motor CF through a gearbox CG, a chain tensioning device CH and a fluid coupling CJ. The drive assembly for the plough B likewise comprises a drum DE, an electric motor DF, a gearbox DG equipped with a shear pin drum DK, a chain tensioning device DH and a fluid coupling DJ. Each gearbox CG and DG houses main and secondary gearing in known manner, the main gearing of the gearbox DG driving the shear pin drum DK. Each of the components CF to CJ and DF to DJ has flanges whereby the components are bolted together.

When the installation is working the drum CE is continuously driven so as to circulate a pair of endless chains L which carry the flights of the conveyor A, while the drum DE is driven alternately in opposite directions so that an endless chain M draws the plough B back and forth along the face.

When, for example, during repair work it is necessary to tension either the pair of chains L or the chain M, the electric motor CF or DF in the appropriate drive assembly is halted, the chain M or pair of chains L, as the case may be, locked by a locking device N or O respectively, and the appropriate chain tensioning device CH or DH operated. FIG. 1 shows the situation after both tensioning devices CH and DH have operated to tension the lower, return runs of the chains L and M so as to produce amounts of slack chain between the drums CE and DE nd the locking devices. With the tensioning devices CH and DH maintaining the lower runs in tension, this slack chain may be removed.

However, unlike the type of drive assembly described with reference to FIG. 1, the chain-tensioning device of the drive assembly of the present invention is incorporated within the housing of the conventional fluid coupling device which transfers drive from the main motor to the gearbox, that is to say the parts CH and CJ and the parts DH and DJ of the drive assemblies of FIG. 1 are formed, in each case, within a common housing. The gearbox is provided with an input shaft longer than that of a conventional gearbox to enable it to span the extra distance between the gearbox and the fluid coupling device caused by extending the fluid coupling housing to accommodate the chain-tensioning device.

Figure 2:
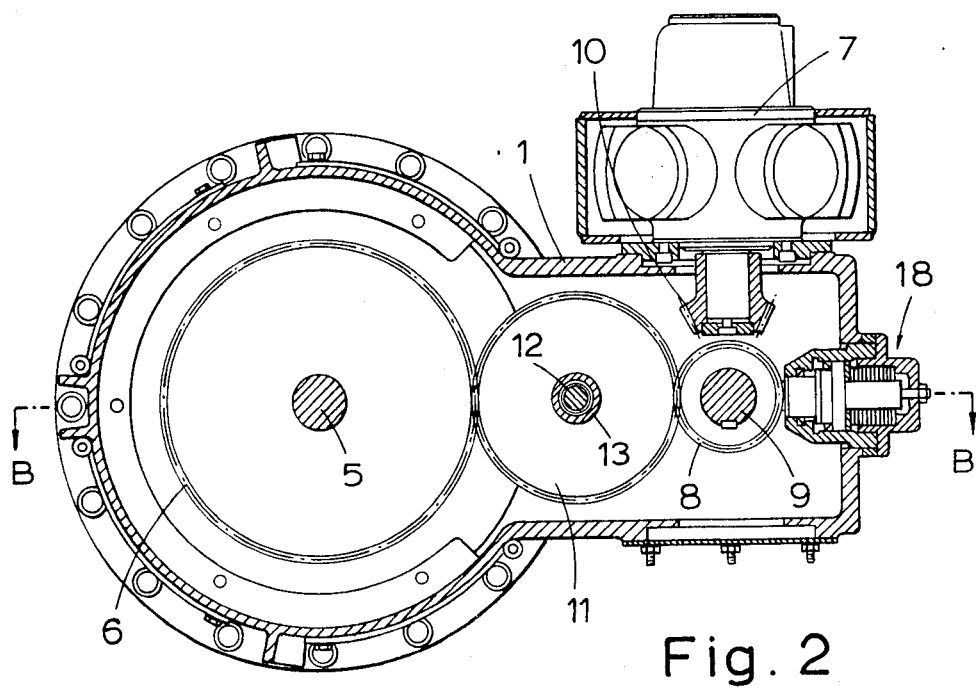
FIG. 2 is a cross-section, taken on the line A—A of FIG. 3, through a fluid coupling/chain-tensioning device in accordance with the present invention.
Figure 3:
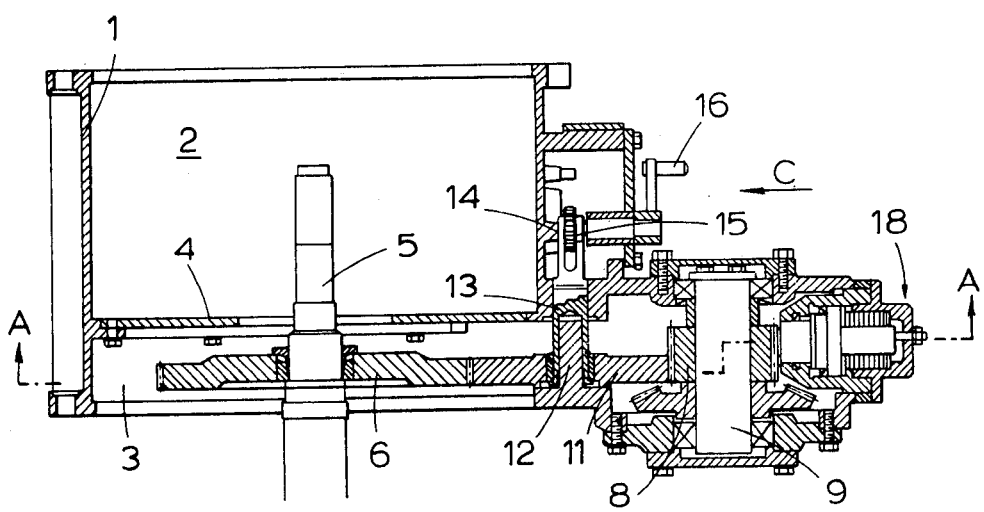
FIG. 3 is a cross-section taken on the line B—B of FIG. 2.
Figure 4:
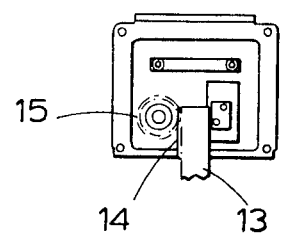
FIG. 4 is a view in the direction of arrow C of FIG. 3 and shows an electric interlock box for the chain-tensioning device, the lid of the box being removed.

Referring now to FIGS. 2 to 4, the combined fluid coupling/chain-tensioning unit has a housing 1 divided into two compartments 2 and 3 by a dividing plate 4. The dividing plate is included to minimise the access of dust into the drive mechanism of the chain-tensioning device. The fluid coupling device (not shown) is housed within the compartment 2 and the chain-tensioning device is housed within the compartment 3. Drive to the gearbox (not shown) is transmitted from the fluid coupling device via a gear input shaft 5 which is longer than that of a conventional gearbox. A gearwheel 6 is mounted on the shaft 5 by means of a proprietary locking device such as a Ringfeder. The use of this device avoids the need for keys which would produce stress raisers in the shaft 5.

A hydraulic motor 7 is mounted on the housing 1, this motor driving a pinion 8 on a shaft 9 by way of a bevel gear 10. The pinion 8 is in constant mesh with an intermediate gearwheel 11 which is movable along a shaft 12 into and out of mesh with the gearwheel 6. The gearwheel 11 is fixed to a hollow shaft 13 which slides on the shaft 12 which in turn is fixed to the housing 1. The gearwheel 11, together with the hollow shaft 13, is moved along the shaft 12 by means of a rack 14 and pinion 15 controlled by a handle 16, the rack being fast to the shaft 13. Movement of the hollow shaft 13, and consequently movement of the gearwheel 11 is sensed by a microswitch 17 which constitutes an electric interlock and controls flow of electric current to the main motor (not shown).

The chain tensioning device may be locked by a mechanical locking device 18 which is spring loaded to engage with the pinion 8. Application of hydraulic pressure to turn the hydraulic motor 7 also introduces a pressure to the mechanical locking device 18 which lifts it clear of the pinion 8.

Figure 5:
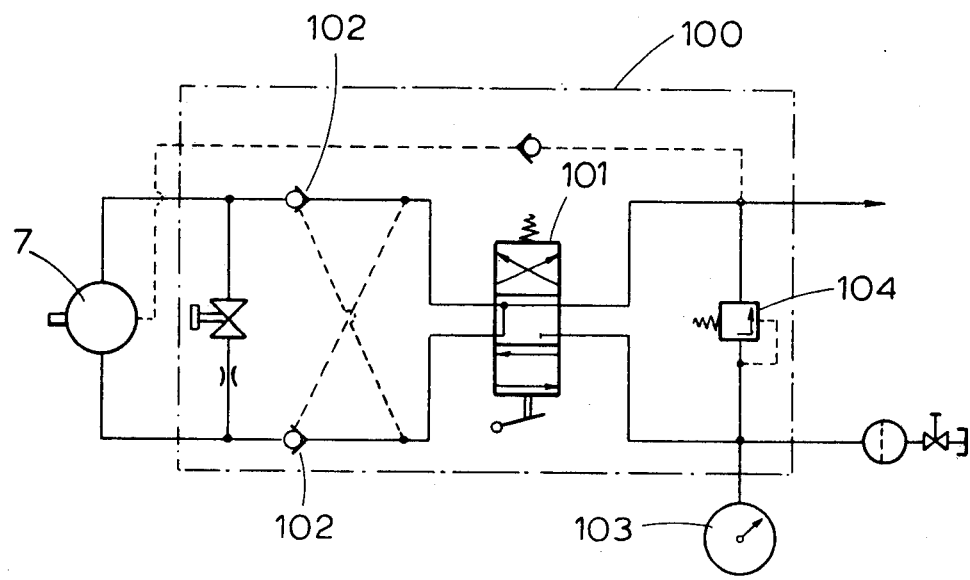
FIG. 5 is a schematic diagram illustrating one hydraulic circuit for the chain-tensioning device.

A hydraulic control circuit is housed in a manifold 100 (FIGS. 1 and 5) and the circuit includes a control valve 101 enabling the motor 7 to be placed in neutral or to be driven forwards or in reverse, and check valves 102 to isolate and lock the motor 7 when the valve 101 is placed in neutral. A pressure gauge 103 allows the pressure in the system (and hence the chain tension) to be observed, and an adjustable relief valve 104 is provided to divert the flow of fluid from the motor 7 when once a desired tension has been achieved.

The sequence of operation of the apparatus described in FIG. 1 as modified by FIGS. 2 to 5 is as follows:

1. The handle 16 is operated to mesh gearwheel 11 with gearwheel 6. Electric motor CF or DF is switched off prior to the meshing of these two gearwheels, as the initial movement of the handle 16 actuates the microswitch 17 to activate the electrical interlock and interrupt the power supply to the motor.
2. The chain locking device N or O is engaged.
3. The directional flow control valve 101 is operated. The hydraulic motor 7 then drives the chain drum CE or DE via the main gearbox CG or DG.
4. When the required chain tension is reached, this being determined by reference to the pressure gauge 103 or by operation of the relief valve 104, the flow control valve 101 is moved to neutral and pressure then held in the system by means of the mechanical locking device 18. The chain M or pair of chains L can be uncoupled and slack chain removed.
5. The directional flow control valve 101 is operated to reverse the hydraulic motor 7 unit the chain locking device N or O is free.
6. The flow control valve 101 is returned to neutral and the chain locking device N or O removed.
7. The handle 16 is operated to disengage the gearwheels 11 and 6 and automatically disengage the electric interlock on the power supply.

FIG. 6 shows a modified form of fluid coupling/chain-tensioning device which is particularly useful for application to gearboxes of higher horse power. As the device of FIG. 6 is very similar to that of FIGS. 2 to 4 like reference numerals are used for like parts and description of the device will be limited to those parts of the device which have been modified. The basic difference between the two embodiments is that the housing 1 in the FIG. 6 embodiment is formed in three parts 1a, 1b, and 1c. The chain tensioning device including the hydraulic motor 7, the bevel gear (not shown), the gearwheels 8 and 11, together with the handle 16, its associated gear selector mechanism and the electric interlock, are housed in the housing part 1a which forms a first detachable unit. The second housing part 1b, which forms a second detachable unit, constitutes that part of the housing 1 which surrounds the gearwheel 6, which includes the dividing plate 4 and which forms that part of the compartment 2 adjacent to the gearbox. The third housing part 1c houses the rest of the fluid coupling which in FIG. 6 is indicated generally by the reference numeral 20.

The advantages of this modified housing structure are that the chain-tensioning device can be removed as a unit (within housing part 1a) and replaced without disturbing the main drive assembly. Moreover, by removing the housing part 1c, the so shortened fluid coupling housing leaves sufficient space to allow the fluid coupling 20 to be lowered onto the gearbox input shaft 5 whilst still suspended by sling chains. FIG. 6 shows, in chain dot, the fluid coupling 20 in this partially assembled condition, the fluid coupling having been lowered onto the shaft 5 to this point. The sling chains can then be removed and the fluid coupling 20 pushed home. The housing part 1c can then be replaced. This feature is most important with high horse power units, since the larger fluid couplings involved can weigh up to 600 lbs when filled with fluid.

Of course, modifications may be made to the illustrated embodiments. Thus, for example, rubber-type resilient couplings may be used in place of fluid couplings. Also, instead of making use of an abnormally long gearbox shaft 5 for supporting the gearwheel 6, the gearwheel 6 may be mounted on a separate shaft which is received in the fluid coupling and drivably connected to the gearbox shaft which would then be of normal length.

Alternatively, the tensioning device may have its own separate housing which is located between the housings of the gearbox and the fluid coupling, but the gearwheel 6 would then remain mounted on an abnormally long gearbox input shaft 5. In this case, the gearwheel 6 would form a component separate from the remaining parts of the chain-tensioning device.

I claim:

1. A drive assembly for a mineral mining installation, said assembly comprising:
   a. a rotatable output member;
   b. a transmission;
   c. a main motor for driving said rotatable output member via said transmission; and
   d. a chain-tensioning device for driving said rotatable output member at a reduced speed:
   said transmission comprising:
   1. main gearing in driving connection with said rotatable output member;
   2. a gear input shaft for said main gearing; and
   3. a resilient coupling device in driving connection with said main gearing via said gear input shaft and in driven connection with said main motor;
   wherein said chain-tensioning device and said resilient coupling device are mounted in the same housing.

2. A drive assembly according to claim 1, wherein said resilient coupling device is constituted by a fluid coupling device.

3. A drive assembly according to claim 1, wherein said resilient coupling device is constituted by rubber-type coupling device.

4. A drive assembly according to claim 1, wherein said housing is a one-piece housing.

5. A drive assembly according to claim 1, wherein said housing is formed in two sections, one section housing said resilient coupling device and the other section housing said chain-tensioning device.

6. A drive assembly according to claim 2, wherein said housing is formed in three sections, two of said sections housing said fluid coupling device, and the other section housing said chain-tensioning device.

7. A drive assembly according to claim 1, wherein said housing includes a dividing plate positioned between said resilient coupling device and said chain-tensioning device.

8. A drive assembly according to claim 1, wherein said chain-tensioning device comprises:
   a. a main gearwheel fast to said gear input shaft;
   b. an intermediate gearwheel shiftable within said housing into and out of meshing engagement with said main gearwheel;
   c. a pinion in constant mesh with said intermediate gearwheel; and
   d. an auxiliary motor having a drive shaft carrying said pinion.

9. A drive assembly according to claim 8, wherein said auxiliary motor is a hydraulic motor.

10. A drive assembly according to claim 8, wherein said main motor is an electric motor, and electric circuit means are provided for supplying electric current to said main electric motor, said chain-tensioning device having a switch operable to interrupt said circuit means when said pinion and said main gearwheel of said chain-tensioning device are in meshing engagement.

11. A drive assembly according to claim 1, wherein said chain-tensioning device comprises:
   a. a main gearwheel fast to a shaft drivably connected to said gear input shaft;
   b. an intermediate gearwheel shiftable within said housing into and out of meshing engagement with said main gearwheel;
   c. a pinion in constant mesh with said intermediate gearwheel; and
   d. an auxiliary motor having a drive shaft carrying said pinion.

12. A drive assembly according to claim 11, wherein said auxiliary motor is a hydraulic motor.

13. A drive assembly according to claim 11, wherein said main motor is an electric motor, and electric circuit means are provided for supplying electric current to said main electric motor, siad chain-tensioning device having a switch operable to interrupt said circuit means when said pinion and said mains gearwheel of said chain-tensioning device are in meshing engagement.

14. In a drive assembly for a mineral mining installation, said assembly comprising:
   a. a rotatable output member;
   b. a transmission;
   c. a main motor for driving said rotatable output member via said transmission; and
   d. a chain-tensioning device for driving said rotatable output member at a reduced speed;
   said transmission comprising:
   1. main gearing in driving connection with said rotatable output member; and
   2. a resilient coupling device in driving connection with said main gearing and in driven connection with said main motor;
   the improvement comprising mounting said chain-tensioning device and said resilient coupling device in the same housing.

15. A drive assembly for a mineral mining installation, said assembly comprising:
   a. a rotatable output member;
   b. a transmission;
   c. a main electric motor for driving said rotatable output member via said transmission; and
   d. a chain tensioning device for driving said rotatable output member at a reduced speed;
   said transmission comprising:
   1. main gearing in driving connection with said rotatable output member;
   2. a gear input shaft for said main gearing; and
   3. a fluid coupling device in driving connection with said main gearing via said gear input shaft and in driven connection with said main electric motor;
   said chain-tensioning device comprising:
   1. a main gearwheel fast to said gear input shaft;
   2. an intermediate gearwheel shiftable into and out of meshing engagement with said main gearwheel
   3. a pinion in constant mesh with said intermediate gearwheel;
   4. a hydraulic motor having a drive shaft carrying said pinion; and
   5. a switch operable to interrupt the supply of electric current to said main electric motor when said pinion and said main gearwheel are in meshing engagement;
   wherein said chain-tensioning device and said fluid coupling device are mounted in the same housing.